Aug. 31, 1926.

W. O. JAMES ET AL

METHOD OF MAKING FOOD PRODUCTS

Filed Feb. 16, 1923    2 Sheets-Sheet 1

Aug. 31, 1926.

W. O. JAMES ET AL

METHOD OF MAKING FOOD PRODUCTS

Filed Feb. 16, 1923

Inventors:
Wallace O. James,
Owen James,

By Attorneys.

Patented Aug. 31, 1926.

1,597,979

UNITED STATES PATENT OFFICE.

WALLACE O. JAMES AND OWEN JAMES, OF BROOKLYN, NEW YORK.

METHOD OF MAKING FOOD PRODUCTS.

Application filed February 16, 1923. Serial No. 619,528.

This invention relates to a method of making food products of the general character described in applications Serial Nos. 619,526 and 619,527, filed by us February 16, 1923 and constituting, in part, continuations of our prior abandoned application Serial No. 572,777, filed July 5, 1922.

The invention has for its object to produce, quickly, inexpensively, and as required for consumption, a food product of attractive appearance, and which is both palatable and digestible, which can be conveniently handled as it is eaten, and which is otherwise in accordance with public taste and demand so as to have a ready sale.

Generally speaking, said food product comprises a core or filler of edible material which is completely enclosed by a shell or casing of dough or the like, the whole being, in accordance with the present invention, baked in a mold in such a manner as to produce an article of a definite shape predetermined by the shape of the mold, which article can be readily held in the hand while being eaten, and in which the filler and shell, while retaining their characteristic qualities, are so combined as to render the whole both palatable and digestible.

The more particular objects of the invention will best be understood from the following explanation of the making of one form of food product illustrated in the accompanying drawings by means of the apparatus shown therein. It will be understood, however, that the particular operations and materials described and the particular apparatus shown have been chosen for illustrative purposes merely, and that the invention, as defined by the claim hereunto appended, may be otherwise practiced without departure from its spirit or scope.

Figure 1:
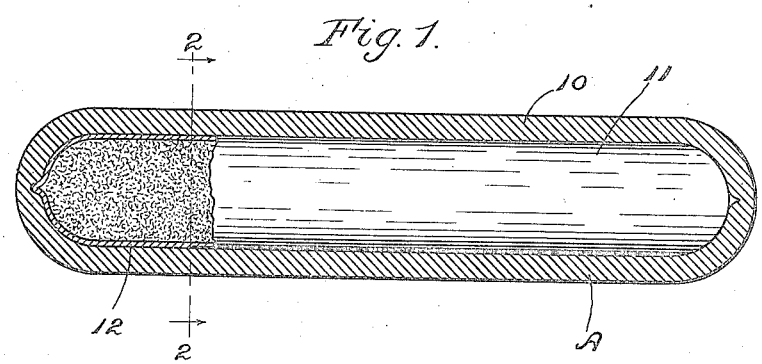
Fig. 1 is a longitudinal section of an article of food made in accordance with the invention.
Figure 2:
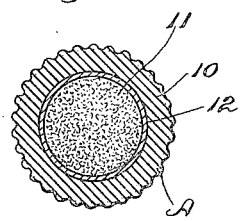
Fig. 2 is a transverse section thereof.

The article shown in Figs. 1 and 2 is of approximately cylindrical shape having rounded ends and comprising a shell or casing 10 and a filler or core 11 completely enclosed at its sides and ends by said shell or casing. The shell 10 is composed of dough A which may be of any suitable character, such as bread, doughnut or pastry dough, but which, prior to the baking of the article, as hereinafter more fully explained, is preferably in the form of a relatively thick batter similar to that employed for making griddle cakes and waffles, and the precise character of which may be determined by individual taste and the nature of the filler with which it is used. Said filler or core may also assume a variety of forms, but as herein shown comprises a sausage, preferably of the Frankfurter type, having an enclosing skin or case 12. With such a filler an unsweetened dough, in the nature of a griddle cake or waffle batter of any suitable mixture, is preferably employed.

Figure 3:
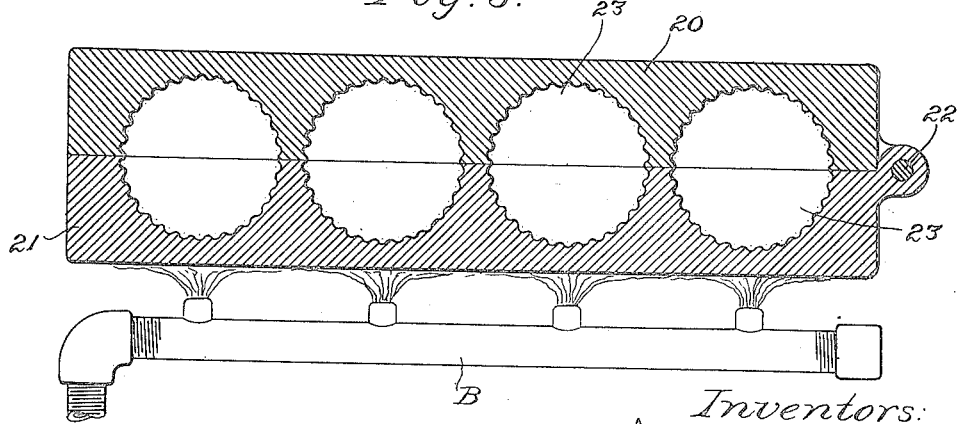
Fig. 3 is a sectional view of a mold suitable for the production of the articles shown in the preceding figures.
Figure 4:
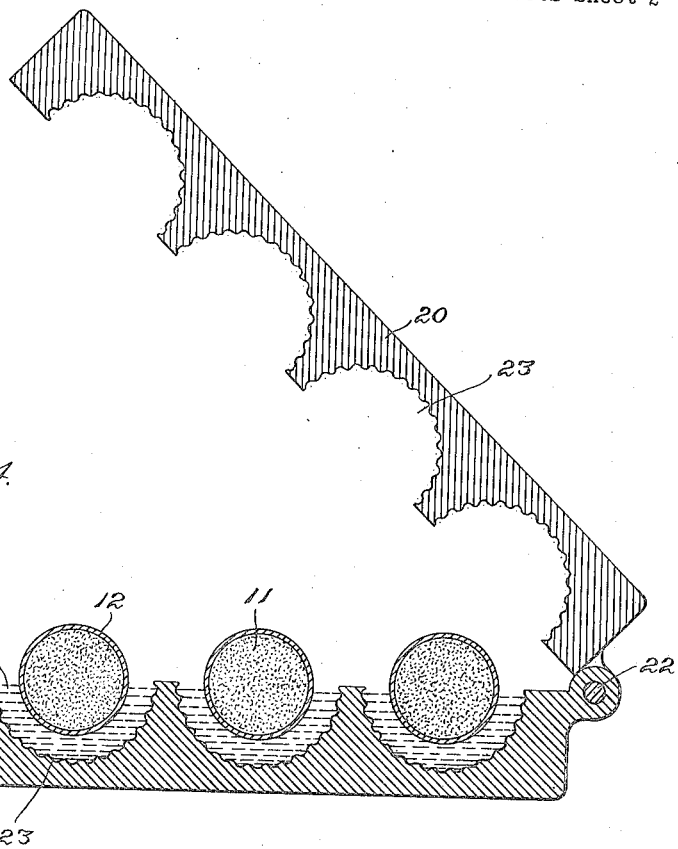
Figs. 4 and 5 are similar views illustrating different steps in the operation.
Figure 5:
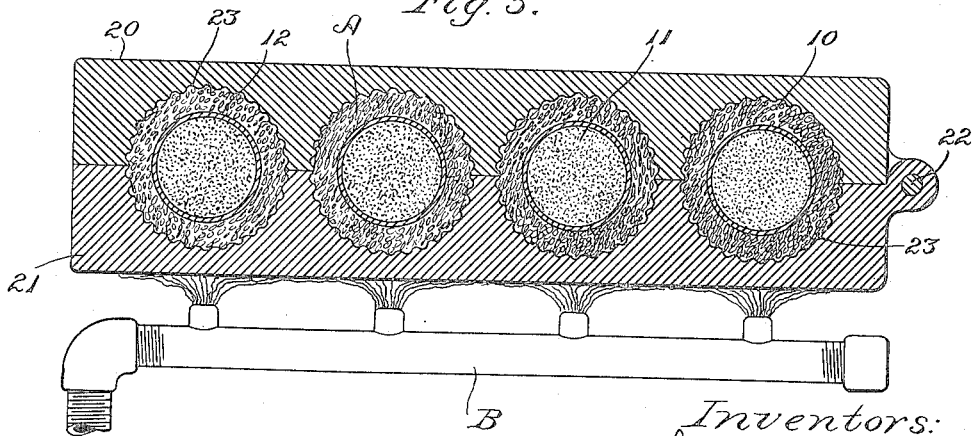

In Figs. 3, 4 and 5 is shown a mold suitable for the cooking of the articles above described. Said mold comprises upper and lower sections 20 and 21 connected by a hinge 22 and having complementary mold cavities 23. In use in accordance with the invention, the upper mold section 20 is lifted, as shown in Fig. 5, a quantity of the dough or batter A introduced into the mold cavities 23 of the lower section 21, and the fillers 11, preferably in uncooked condition, then placed upon the dough. If desired, more dough may be placed in the mold cavities after the introduction of the filler, but in any event only sufficient dough is introduced to fill the lower mold cavities without overflowing. The upper mold section 20 is then lowered, as shown in Fig. 5, to close the mold, and the latter suitably heated, as by placing the same upon a stove or over a suitable burner B. The heat from said burner is transmitted through the mold to the dough of the shell, and through the latter to the filler, cooking the latter. The heat of the mold causes the dough in each mold cavity of the lower section to expand, as shown in Fig. 5, completely enclosing the filler, filling the mold cavity, and taking on the shape and configuration of the latter. As shown, the mold is formed with irregularities, which prevent the sausage from resting too much upon the bottom of the mold, although the sausage tends to float on the batter. Evolution of gas and steam in the body of the batter lessens its specific gravity sufficiently to prevent the sausage from being forced against the top of the mold. If desired, after a short period of cooking in the first position of the mold, it may be inverted as with a waffle iron if a flame is used for cooking. It will, of course, be understood that said mold cavities will be of the shape of the desired article, said cavities in the present instance being of substantially cylindrical form with rounded ends to suitably mold the article shown in Figs. 1 and 2. Also as herein shown said mold cavities are formed with longitudinal corrugations or flutings to form a similarly corrugated or fluted surface on the exterior of the article, but said cavities may, if desired, be smooth or formed with other ornamentation in accordance with the desired configurations of the article produced.

It is found in practice that by the foregoing method an article can be produced having a crisp and light outer shell and a thoroughly filler which is more or less distinct from the shell, completely filling, but its juices not penetrating the same to an objectionable extent. In the particular instance herein referred to, wherein a sausage is employed for the filler, it is found that a given degree of heat applied through the mold for a sufficient length of time to thoroughly cook the dough, will also, when transmitted through the dough to the sausage thoroughly cook the latter without breaking its skin, which skin, remaining intact, retains the juices of the sausage and prevents them from soaking into the dough. It is also found that an effect of the mold baking is to straighten the sausage from its original slightly curved form, causing the same to conform to the substantially cylindrical shape of the article as a whole, as imposed by the shape of the mold cavities. The resulting article is therefore symmetrical and attractive in appearance, is both palatable and digestible, and may be readily eaten while held in the hand without inconvenience.

In the operation described, the batter will tend to seal the joint between the mold sections, causing at least a partial retention of steam generated therein, preventing an excessive drying out of the envelope, assuring a more rapid cooking of the sausage within the batter or such heating thereof as possible, and will also oppose—in the early stage of cooking of the envelope—the extrusion of juices from the sausage permitting the batter to become cooked readily.

Having thus described our invention, we claim:

The herein described method of making a food product which consists in introducing into a mold a quantity of batter together with a sausage, closing the mold so as to enclose said batter and sausage completely, and heating said mold to cause said batter to expand and enclose said sausage while conforming itself to the shape of said mold.

In testimony whereof we affix our signatures.

WALLACE O. JAMES.
OWEN JAMES.